Figure 1:
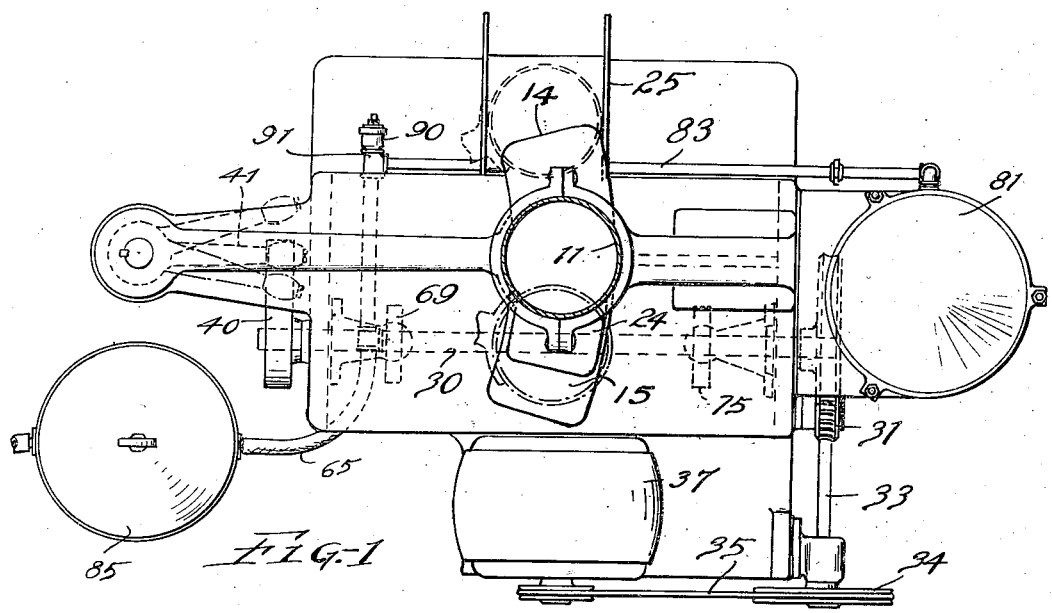

May 20, 1924.

F. T. ROBERTS 1,494,709

MACHINE FOR INFLATING HOLLOW RUBBER ARTICLES

Filed June 20, 1921    3 Sheets-Sheet 1

INVENTOR
Fred Thomas Roberts
By Bakis & Macklin
ATTORNEYS

May 20, 1924.  
F. T. ROBERTS.  
MACHINE FOR INFLATING HOLLOW RUBBER ARTICLES  
Filed June 20, 1921

INVENTOR  
Fred Thomas Roberts  
BY Baker & Macklin  
ATTORNEYS

May 20, 1924.
F. T. ROBERTS
MACHINE FOR INFLATING HOLLOW RUBBER ARTICLES
Filed June 20, 1921    3 Sheets-Sheet 3
1,494,709
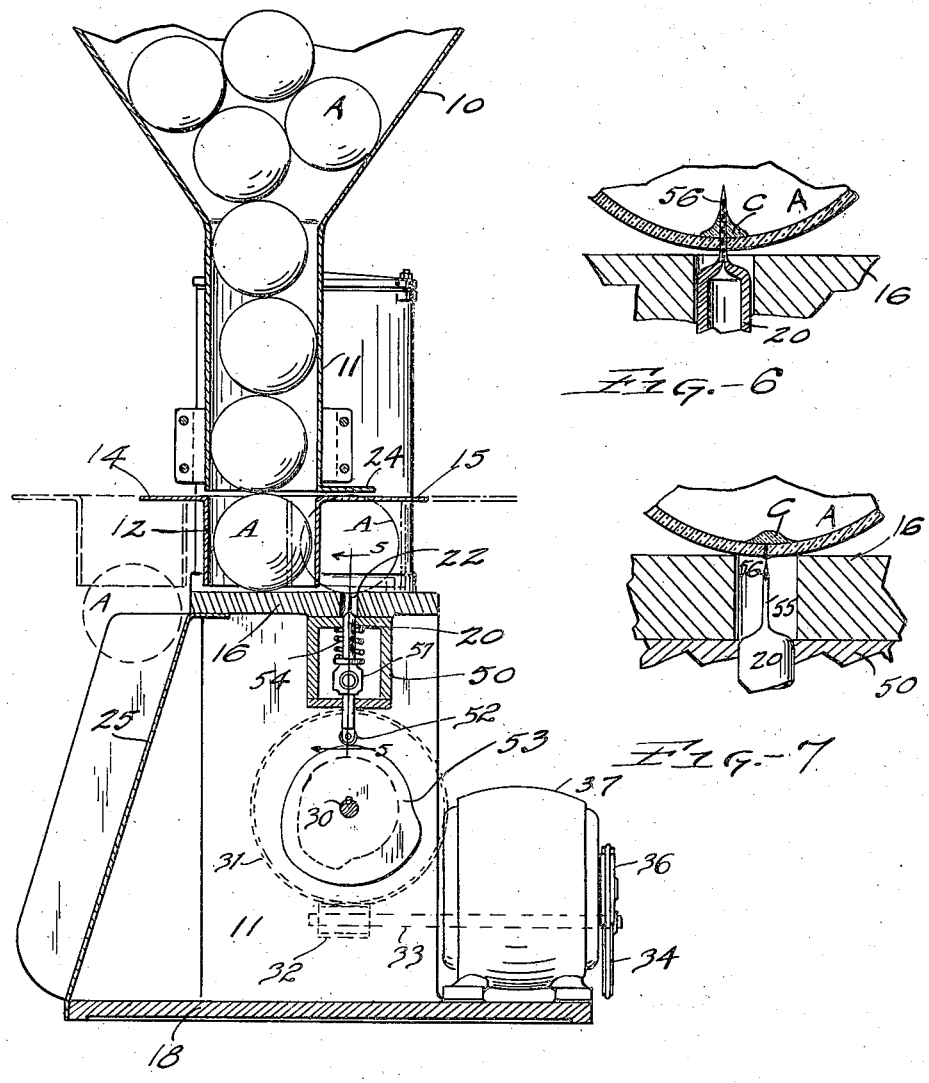

Patented May 20, 1924.

1,494,709

UNITED STATES PATENT OFFICE.

FRED THOMAS ROBERTS, OF PHILADELPHIA, PENNSYLVANIA.

MACHINE FOR INFLATING HOLLOW RUBBER ARTICLES.

Application filed June 20, 1921. Serial No. 478,884.

*To all whom it may concern:*

Be it known that I, FRED THOMAS ROBERTS, a citizen of the United States, residing at Philadelphia, in the county of Philadelphia and State of Pennsylvania, have invented a certain new and useful Improvement in Machines for Inflating Hollow Rubber Articles, of which the following is a full, clear, and exact description, reference being had to the accompanying drawings.

One of the objects of this invention is to provide for the rapid and economical inflation of hollow elastic articles, rubber balls for instance. Another object is to effectively seal the inflating opening.

Heretofore in the manufacture of rubber balls it has been customary to secure to the interior surface, before the parts of the ball were vulcanized, a plug of para rubber and after vulcanization to insert manually a hypodermic needle through the plug, inflating air being admitted through the needle, the needle being then withdrawn and the elasticity of the plug being relied upon to close the opening made by the needle. Such a method of manufacture has several disadvantages. The plugs frequently fail to entirely close the opening and allow gradual leakage of the pressure within the article; sometimes the plugs become loose from the wall of the article, whereupon it immediately loses its internal pressure; not infrequently the operator fails to properly locate the plug and inserts the needle through the wall of the article at the side of the plug so that no seal is obtained. There is also a considerable expense in the aggregate in the cost of the plugs and in the labor of placing and piercing them.

It is the object of my invention to do away with all of the above disadvantages. I accomplish this, first by mechanically feeding the articles from a supply and holding them one after another in juxtaposition with the hollow needle, which is moved by mechanism into the article and, secondly by injecting cement into the interior of the article which upon withdrawal of the inflating needle will seal the opening. More particularly I puncture the wall of the held article with a hollow needle and first inject cement through this needle into the interior, then shut off the cement and inject compressed air or other fluid to inflate the article, then shut off such fluid and withdraw the needle, whereupon the cement, pressed outwardly by the internal pressure, follows the needle through the puncture and seals it.

My invention provides very simple and efficient mechanism for automatically performing the various movements mentioned and delivering the articles in rapid succession. The invention is hereinafter more fully explained and the essential novel features summarized in the claims.

Figure 2:
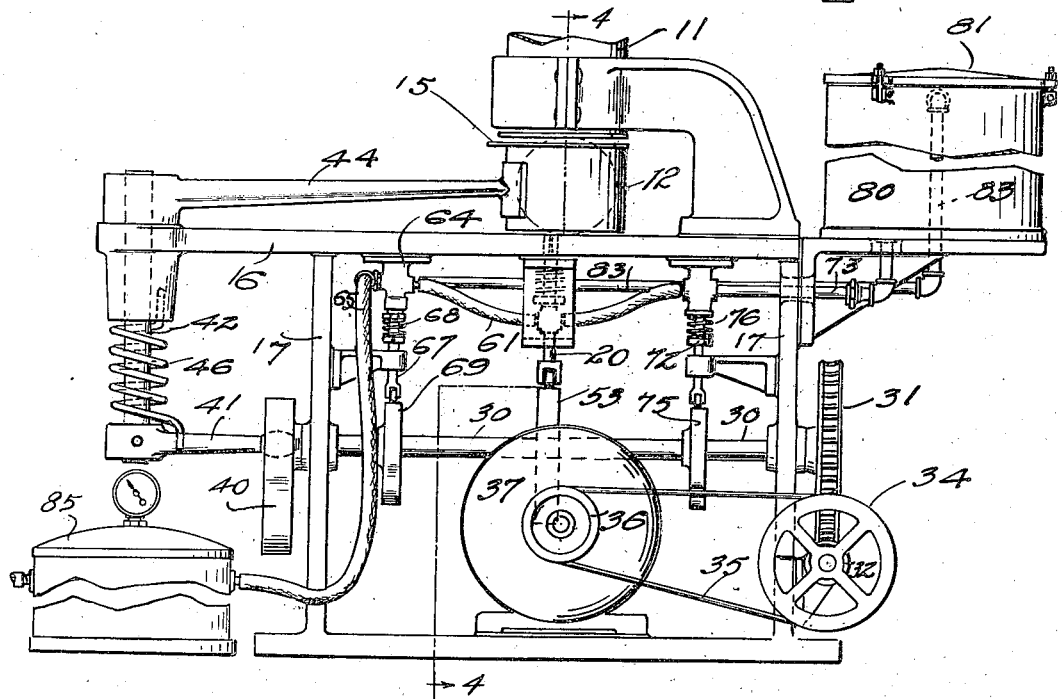
Figure 3:
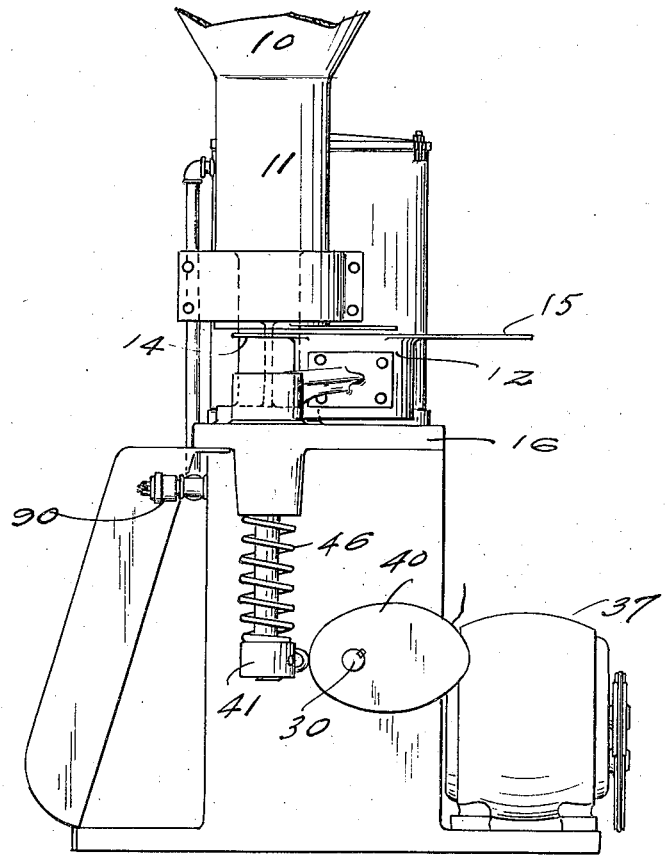
Figure 5:
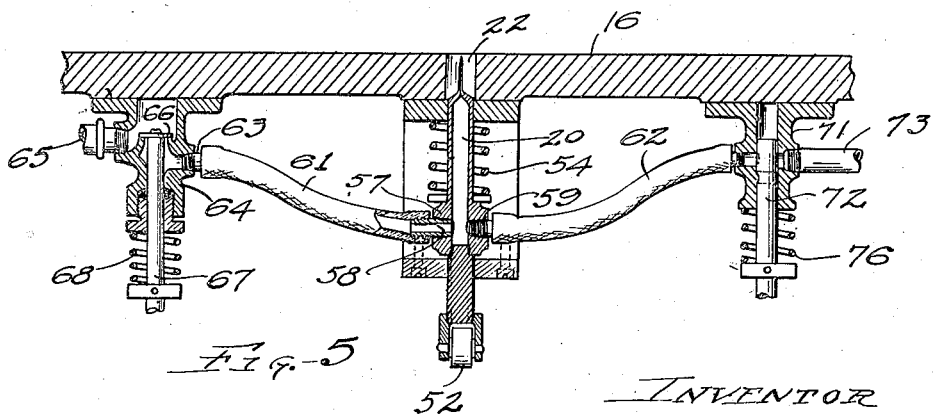

In the drawings Fig. 1 is a plan of one embodiment of my invention; Fig. 2 is a rear elevation thereof; Fig. 3 is an end elevation; Fig. 4 is a vertical section in a plane parallel with Fig. 3; Fig. 5 is an enlarged section through the needle and valves on a plane indicated by the line 5—5 in Fig. 4; Figs. 6 and 7 are enlarged details illustrating the needle when inserted in the rubber article and after withdrawal therefrom; Fig. 8 is a detail of a relief valve which may be employed on one of the air lines.

As shown in Figs. 1 and 3, 10 designates a hopper adapted to contain hollow rubber articles, as for instance balls A, this hopper having a tubular depending neck portion 11, down which the balls may drop by gravity in a single column. 12 indicates a suitable gate mechanism for feeding the balls one after another from the base of the hopper to the inflating mechanism and thence to the discharge point. As shown this gate has a vertical cylindrical body of a diameter slightly greater than that of the ball and a height perferably slightly less than that of the ball. At the upper end of the cylindrical body on opposite sides are flanges 14 and 15 which are adapted to shut off discharge from the hopper neck when the body is moved in either direction from alignment with that neck. 16 designates a horizontal table of the machine on which the lowermost ball rests. This table is carried on upright standards 17, rising from a bed plate 18. The hollow perforating needle is designated 20. It is mounted below the table 16 and may be raised through an opening 22 therein. At one edge of the table is a discharge chute 25 for receiving the inflated balls.

It will be seen from the above described construction that the bottommost ball in the hopper drops by gravity into the cage 12, and that thereafter if this cage is moved toward the right in Fig. 4 it will carry the ball over the needle and beneath a suitable abutment 24 projecting from the hopper neck, while at the same time the gate 14 will shut off the discharge from the hopper. After inflation by the hollow needle as hereinafter explained, a reverse and greater movement of the cage will carry the inflated ball to the left beyond the table 16 where it will drop by gravity down the discharge chute 25, while the gate member 15 will shut off discharge from the hopper. Then, as the gate returns to normal position as shown in Fig. 4, a fresh article will drop into its body.

Any suitable mechanism may be employed for giving the gate mechanism the movement described. I have shown such movement as caused by the same shaft which operates the needle and its valves as hereinafter explained.

This shaft is designated 30 and is shown as mounted in the standards 17 and as carrying a worm wheel 31, meshing with a worm 32 on the shaft 33 of which is a pulley 34 which is connected by a belt 35 with a pulley 36 on the armature shaft of an electric motor 37. A suitable cam 40 on the end of the shaft 30 operates against a roller on a rock arm 41 secured to a rock shaft 42 journaled in an extension of the table 16. On the upper end of this rock shaft is a rock arm 44 carrying the cage or gate member 12. A spring 46 tends to keep the arm 41 in engagement with the cam 40 and to force the gate member toward the right in Fig. 4.

The hollow needle is mounted to slide vertically in a suitable box-like member 50 secured to the under side of the table 16. On the lower end of this needle is a roller 52 bearing against a cam 53 on the shaft 30. A suitable spring 54 surrounding the needle tends to depress it with the roller in engagement with the cam. At the proper time, however, an increasing edge of the cam shoves upwardly on the needle to cause it to puncture the article, as the ball A. The normal or idle position of the needle is as indicated in Fig. 7. When raised by the cam it has the position indicated in Fig. 6, the small active portion 55 having passed through the wall and the eye 56 lying above it.

The body of the needle is formed with an enlargement 57 to which are secured nipples 58 and 59 (Fig. 5) the nipples being shown as tapped into the boss. They communicate with the internal bore of the needle. Coupled to the nipples 58 and 59 are flexible tubes 61 and 62 adapted to convey air and cement respectively to the needle. Each of these tubes leads from a suitable controlling valve. Thus the tube 61 is coupled to nipple 63 in the valve casing 64, to which leads an air pipe 65. This valve is controlled by a suitable plunger 66 having a downwardly extending rod 67 surrounded by a downwardly acting spring 68. On the lower end of the rod is a roller bearing on a cam 69 on the shaft 30. The cement valve comprises a casing 71 and a plunger 72 therein for controlling communication between the cement pipe 73 and the discharge pipe 62. The plunger extends downwardly and coacts with a cam 75 on the shaft 36, a spring 76 tending to depress the plunger.

The various cams on the shaft 30 are so timed in relation to each other that immediately after the gate member has brought the article into a position over the needle the cam 53 acts and raises the needle to puncture the article, both valves being still closed. Then the cam 75 acts to open the valve 71, whereupon cement is admitted under pressure from the line 73 through the valve 71 and pipe 62 into the hollow needle and thence through it into the interior of the ball as indicated at C in Fig. 6. Then the cam 75 allows the spring 76 to close the cement valve and the cam 69 opens the air valve 64. This admits air from the pipe 65 through the valve and pipe 61 and hollow needle into the interior of the ball to inflate it. Then the cam 69 allows the spring 68 to close the air valve. Immediately after the closing of the air valve the cam 53 relieves the pressure on the needle and the spring 54 moves it downwardly out of engagement with the article, whereupon the cement not only closes over the puncture on the inside, but passes through it and effectively seals it as indicated in Fig. 7. The cement employed is of rapidly drying character, and is of sufficient consistency so that it will not be unduly forced out by the air pressure within the ball.

Following the withdrawal of the needle the cam 40 acts on the arm 41 to carry the finished ball over the discharge chute 25 down which it drops by gravity. On the return stroke of the arm a fresh ball drops into the cage and is carried to the inflating position, and the operation automatically repeated.

Any suitable arrangement may be employed to supply the air pressure and feed the cement. I have shown a cement tank 80 having a removable air-tight top 81 through which the cement may be inserted. The pipe 73 leads from the bottom of this tank. An air pipe 83 leads to the tank and enables air pressure to be supplied to the interior to force the cement downward with a positive pressure. This air pipe 83 may connect by a T with the air pipe 65 which leads from any suitable source of air supply, as for example a tank 85.

A suitable relief valve may prevent the air pressure to the needle or cement tank being excessive. By way of example, I have indicated such valve in Figs. 1 and 8 where 90 indicates a tubular body portion connected with the T 91 which connects the pipes 65 and 83. On the body 90 is a cap 92 having openings 93 controlled by an external disk valve 94 normally seated by an internal spring 95 acting on the valve rod 96. An adjustment of the valve nut 97 may vary the maximum pressure which may be transmitted.

It will be seen that I have provided a very simple mechanism which operates entirely automatically to take the articles, one after the other from a suitable supply, inflate them, seal the opening, and discharge the articles. It is only necessary for the attendant to supply the articles to the hopper and remove the finished product and occasionally supply cement to the tank. The article is not only produced much more economically than by the old method but the various disadvantages attendant on the employment of the para-plug are avoided.

Having thus described my invention, I claim:

1. In a machine for inflating hollow rubber articles, the combination with a movably mounted hollow needle of means for feeding the articles one after the other into the path of such needle and there holding the article, means for then moving the needle to cause it to puncture the article and thereafter withdrawing it therefrom, and means for forcing fluid through the needle while its point is within the article.

2. In a machine of the character described, the combination of means for holding an indiscriminate supply of hollow rubber articles, a movably mounted hollow needle, means for presenting the articles successively to the needle, means for causing the needle to enter the article, and means for causing fluid to pass through the needle into the interior of the article.

3. The combination of a hopper for holding a supply of rubber balls, a movably mounted hollow needle, means for feeding such balls one after the other from the hopper into the path of the needle, means for causing said needle to then puncture such ball, and a conduit for fluid communicating with the needle, there being means for withdrawing the needle from the ball after fluid has been fed through the conduit to the interior of the ball.

4. The combination with means for feeding hollow rubber articles one after the other from a supply thereof, of a hollow pointed needle, means for causing it to puncture the rubber articles and enter the same, a conduit for fluid communicating with the hollow needle, a valve in said conduit and mechanism for controlling the valve.

5. The combination of means for holding a supply of hollow articles, a hollow needle, mechanism for causing the same to puncture the articles successively, mechanism for automatically admitting fluid through the needle to the interior of the article, and mechanism for automatically closing the supply of such fluid between successive insertions of the needle.

6. The combination of a hopper adapted to contain a supply of articles to be inflated, a hollow needle, a gate mechanism operating to effect presentation of one article after another to the needle, mechanism for causing the needle to successively enter the articles, a conduit leading to the needle, a valve in said conduit, and mechanism for automatically controlling the valve.

7. In a machine of the character described, the combination of a hopper adapted to contain hollow articles, a depending neck therefor down which the articles may pass, a gate acting on the lowermost article, a hollow needle, mechanism for shoving it into lowermost article, and mechanism for injecting fluid through said needle.

8. The combination of a hopper having a downwardly extending neck down which articles may pass in a column, a gate controlling the lowermost article, a hollow needle, mechanism for shoving the needle upwardly into the article, and thereafter withdrawing it, mechanism for injecting compressed fluid into the article while the needle is inserted, and mechanism for ejecting the article after the needle has been withdrawn.

9. The combination of a hopper having a downwardly extending neck down which articles may pass in a column, a gate controlling the lowermost article, a hollow needle, mechanism for shoving the needle upwardly into the article, and thereafter withdrawing it, mechanism for injecting compressed fluid into the article while the needle is inserted, and mechanism for ejecting the article after the needle has been withdrawn, and mechanism for moving said gate after the needle is withdrawn to carry the article to a discharge position.

10. In a machine of the character described, the combination of means for holding a supply of hollow articles, a hollow needle, gate mechanism for causing articles to be supplied one after the other from the supply to the hollow needle and then discharged, mechanism for moving the needle into and out of articles so presented, a conduit leading to the needle, a valve in said conduit, and mechanism for automatically operating the valve.

11. In a machine for inflating hollow articles, the combination of means for feeding the articles one after another, means for putting cement into the article, and mechanism for thereafter injecting inflating fluid into the article through a puncturing needle, the cement thereafter serving to seal the opening which was occupied by the needle after it has been withdrawn.

12. In a machine for inflating hollow articles, the combination of means for holding a supply of hollow rubber articles, means for feeding them one after the other from the supply to a position for inflation, a movably mounted hollow needle adapted to puncture the article at such position, mechanism for injecting cement into the article through such needle and mechanism for injecting inflating fluid into the article, the cement thereafter serving to seal the opening through which the fluid is injected.

13. In a machine for inflating hollow articles, the combination of mechanism for holding the article, a hollow needle, mechanism for injecting it into the article and thereafter withdrawing it therefrom, means for causing cement to pass to the interior of the article through the hollow needle, and mechanism for causing an inflating fluid to pass into the interior of the article through the hollow needle.

14. In a machine for inflating hollow articles, the combination of mechanism for injecting cement into the interior of the article, a hollow needle, mechanism for causing it to puncture the article, and mechanism for injecting fluid through the needle into the interior of the article, there being mechanism for thereafter withdrawing the hollow needle whereby the cement may seal the opening.

15. In a machine for inflating hollow articles, the combination with means for holding the article, of a hollow needle, mechanism for injecting it into the article and withdrawing it therefrom, and means for forcing cement through the tubular needle into the article and thereafter forcing inflating fluid through the needle into the article.

16. In a machine of the character described, the combination of a hollow needle, two conduits leading thereto from sources of supply of cement under continuous feeding pressure and compressed fluid respectively, and valves in the respective conduits, and mechanism for alternately opening and closing the respective valves.

17. The combination of a hopper adapted to contain a supply of articles to be inflated, a hollow needle, a gate mechanism operating to effect presentation of one article after another to the needle, mechanism for causing the needle to successively enter the articles, two conduits leading to the needle, valves in the respective conduits, means for supplying fluid under pressure to one valve, means for supplying cement to the other, and automatic means for operating said valves.

18. In a machine of the character described, the combination with means for holding a supply of articles, and feeding them successively one after the other, a hollow needle, a pair of conduits leading to the needle from a source of supply of compressed fluid, and a source of sppply of cement respectively, valves in the respective conduits, and automatic mechanism for inserting the needle, for opening and closing the cement valve and the compressed fluid valve respectively, and for then withdrawing the needle.

19. In an inflating machine, the combination with means for holding a hollow article, means for inserting a hollow needle into the lower portion of the articles and thereafter withdrawing the needle, means for injecting cement through the inserted needle into the interior of the article, whereby the cement will lie by gravity about the needle, and means for then injecting compressed fluid into the interior of the article.

20. In a machine for inflating hollow articles, the combination of means for holding the article, mechanism for putting cement into the interior of the article at its lowermost portion, a hollow needle, mechanism for causing it to puncture the article, and mechanism for injecting fluid through the needle into the interior of the article, there being mechanism for thereafter withdrawing the hollow needle whereby the cement may seal the opening.

21. In a machine for inflating hollow articles, the combination of mechanism for holding the article, a hollow needle, mechanism for causing it to enter the article near the bottom and be thereafter withdrawn therefrom, means for causing cement to pass to the interior of the article through the hollow needle into position where it may rest by gravity about the needle, mechanism for causing an inflating fluid to pass into the interior of the article through the hollow needle.

22. In a machine of the character described, the combination of a hollow needle slidably mounted to move substantially vertically upward, means for holding a hollow rubber article over it, mechanism for moving the needle upwardly into the article and thereafter withdrawing it, and mechanism for injecting fluid through the needle while it is in its upward position.

23. In a machine of the character described, the combination of a table, a hollow, needle slidably mounted beneath the table, means for guiding a hollow rubber article on top of the table and over the needle and there holding it, mechanism for moving the needle upwardly through the table and into the article and thereafter withdrawing it, and mechanism for injecting fluid through the needle while it is in its upward position.

24. In a machine of the character described, the combination of a table, a hollow needle slidably mounted beneath the table, mechanism for moving the needle upwardly through the table and thereafter withdrawing it, means for holding a supply of articles to be inflated, means for positioning the articles one after the other above the table over the needle, and means for injecting fluid through the needle.

25. In a machine of the character described, the combination of a table, a hollow needle slidably mounted beneath the table, means for holding a supply of articles to be inflated, means for positioning the articles one after the other above the table over the needle, mechanism for moving the needle upwardly through the table into the article, and thereafter withdrawing it, two conduits communicating with the needle, and mechanisms for injecting cement through one conduit and compressed fluid through the other conduit while the needle is within the article.

26. In a machine of the class described, the combination of a hollow needle, means for positioning a hollow article in juxtaposition therewith, a conduit communicating with the needle, a valve in said conduit, and cam mechanism for operating said valve.

27. In a machine of the class described, the combination of a hollow needle, means for positioning a hollow article in juxtaposition therewith, cam mechanism for causing the needle to enter the article and thereafter withdraw therefrom, a conduit communicating with the needle, a valve in said conduit, and cam mechanism for operating said valve.

28. The combination with a hollow needle, of two conduits leading therefrom, valves in the respective conduits, and cams for opening and closing the respective valves.

29. The combination with a hollow needle, two conduits leading therefrom, valves in the respective conduits, a cam for moving the needle, and cams for opening and closing the respective valves.

30. The combination with a hollow needle, two conduits leading therefrom, valves in the respective conduits, a cam for moving the needle, and cams for opening and closing the respective valves, a shaft carrying said cams, and mechanism for rotating said shaft.

31. The combination of a hollow needle, two conduits leading thereto, valves in the respective conduits, mechanism for holding a supply of articles, movable gate mechanism for causing the articles to be held one after the other in juxtaposition with the needle and thereafter discharged, a shaft, and cam mechanism thereon for moving the hollow needle, for moving the gate mechanism and for operating the respective valves.

32. In a machine of the character described, the combination of a table, a hollow needle slidably mounted beneath it and adapted to project upwardly through it, a hopper above the table having a neck, gate mechanism at the base of the neck adapted to hold the bottommost article in juxtaposition with the needle and thereafter carry it to a discharge position, two conduits leading to the needle, valves in the respective conduits, a shaft, four cams on the shaft for operating the gate mechanism, the hollow needle and the two valves respectively.

In testimony whereof, I hereunto affix my signature.

FRED THOMAS ROBERTS.